(12) United States Patent
Cao et al.

(10) Patent No.: US 7,831,259 B2
(45) Date of Patent: Nov. 9, 2010

(54) SHARING AND TRACKING REAL-TIME LOCATION FOR MOBILE USERS

(75) Inventors: Feng Cao, Sunnyvale, CA (US); Saadat Malik, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 718 days.

(21) Appl. No.: 11/767,445

(22) Filed: Jun. 22, 2007

(65) Prior Publication Data

US 2008/0318593 A1   Dec. 25, 2008

(51) Int. Cl.
*H04Q 7/20*   (2006.01)

(52) U.S. Cl. ............... 455/456.1; 455/456.2; 455/456.3

(58) Field of Classification Search ... 455/456.1–456.3, 455/456.6, 404, 407, 2; 342/357.06–357.09, 342/357.1–357.12
See application file for complete search history.

(56) References Cited

U.S. PATENT DOCUMENTS

| | | | |
|---|---|---|---|
| 5,905,461 A | 5/1999 | Neher | |
| 6,362,778 B2 | 3/2002 | Neher | |
| 6,388,612 B1 | 5/2002 | Neher | |
| 2002/0183069 A1 | 12/2002 | Myr | |
| 2006/0165113 A1* | 7/2006 | Nonoyama | 370/442 |
| 2006/0223518 A1 | 10/2006 | Haney | |
| 2008/0080712 A1* | 4/2008 | Huang et al. | 380/258 |

OTHER PUBLICATIONS

H. Schulzrinne, et al., "RTP: A Transport Protocol for Real-Time Applications" 71 pages, Aquired at: http://www.ietf.org/rfc/rfc1889.txt, Network Working Group, Jan. 1996.
J. Cuellar et al., "Geopriv Requirements", 29 pages, Aquired at: http://www.ietf.org/rfc/rfc3693.txt, Network Working Group, Feb. 2004.
M. Baugher et al., "The Secure Real-Time Transport Protocol (SRTP)", 53 pages, Aquired at: http://www.ietf.org/rfc/rfc3711.txt, Network Working Group, Mar. 2004.
U.S. Appl. No. 11/654,816, filed Jan. 18, 2007, Timothy Stammers, et al.

* cited by examiner

*Primary Examiner*—CongVan Tran
(74) *Attorney, Agent, or Firm*—Trellis IP Law Group, PC

(57) ABSTRACT

In one embodiment, an apparatus can include: a receiver configured to receive location-related data, and to provide real-time location information therefrom; and a processor configured to receive the real-time location information, and to provide an extension in a packet header of a media stream, wherein the header extension comprises the real-time location information.

20 Claims, 9 Drawing Sheets

SHARING AND TRACKING REAL-TIME LOCATION FOR MOBILE USERS

TECHNICAL FIELD

The present disclosure relates generally to sharing and tracking locations for mobile users in real-time.

BACKGROUND

Some conventional approaches for providing location information utilize signaling messages having the location information during a setup time, with subsequent periodic updating. However, this approach may not provide real-time location information effectively due to a large number of signaling messages that may be required. Also, such signaling paths are often different than the media paths, and location information embedded in signaling paths can be disclosed via intermediate nodes (e.g., session initiation protocol (SIP) proxies) along the signaling paths.

DESCRIPTION OF EXAMPLE EMBODIMENTS

Overview

Figure 1:
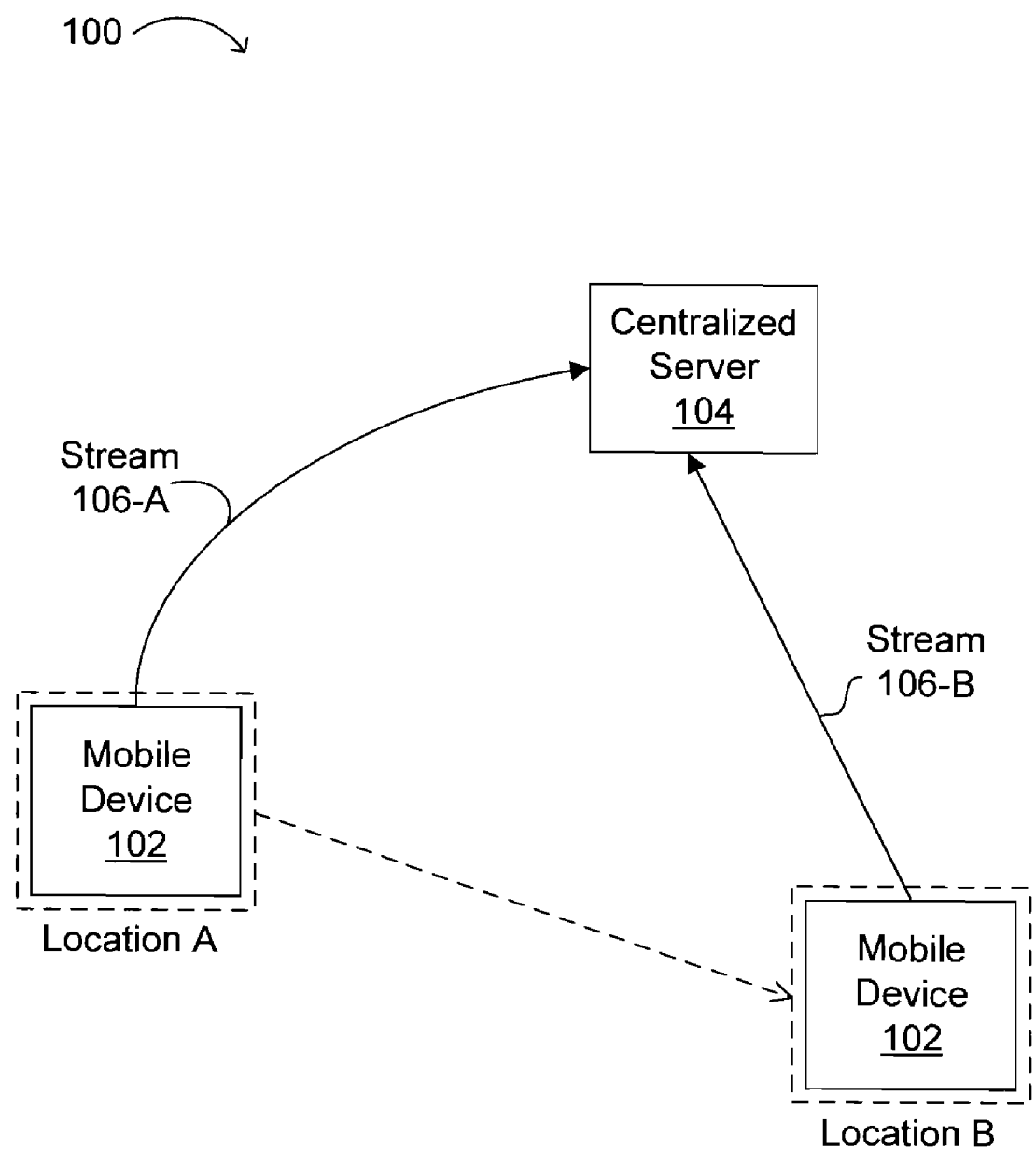
FIG. 1 illustrates an example mobile device location sharing and tracking system.

In one embodiment, an apparatus can include: a receiver configured to receive location-related data, and to provide real-time location information therefrom; and a processor configured to receive the real-time location information, and to provide an extension in a packet header of a media stream, wherein the header extension comprises the real-time location information.

In one embodiment, a method can include: receiving real-time location information in a processor of a mobile device; and embedding the real-time location information into an extension of a packet header in an outgoing media stream from the mobile device in response to a changing location of the mobile device.

Example Embodiments

With rapid advances in wireless networking, Internet protocol (IP) mobility has become more common for mobile users in maintaining connectivity, and allowing communication with other mobile users. For example, one user may use his voice over IP (VoIP) phone in a wireless fidelity (WiFi)-mesh environment for a conference. Further, in some critical infrastructure sectors, real-time mobile location information may be desirable for enhanced functionality.

For example, in emergency services (e.g., fire departments), dynamic positions of each firefighter may be desired in real-time for multiple purposes, such as coordination, information sharing, and real-time decision-making. Another example involves law enforcement, where dynamic positions of police officers can be helpful in managing various situations and/or operations. In these cases, identifying a particular location in need of help, directing a search path, as well as avoiding unnecessary actions, can be useful.

In particular embodiments, a scalable light-weight method for sharing and tracking real-time location for mobile users on multimedia sessions can be provided. Further, using current security mechanisms on media streams (e.g., secure real-time transport protocol (sRTP)) can accommodate real-time location information security from end-to-end, without the involvement of signaling paths.

Because most media streams in IP are formatted in real-time transport protocol (RTP), RTP may be used to demonstrate methods in particular embodiments. However, particular embodiments can also utilize any other suitable media stream format. Further, any suitable type of media stream and/or modality (e.g., audio, video, text, etc.) can be supported in particular embodiments.

In particular embodiments, mobile devices may have an ability to collect real-time location information, such as by using a global positioning system (GPS) receiving component. In particular embodiments, real-time location information may be embedded directly into outgoing media stream packets. For example, this embedding can be performed using digital signal processing (DSP), or encoding software for generating media stream packets. Of course, any suitable general-purpose processor can also be utilized in particular embodiments, such as those involving a laptop as a mobile device. Once a period and number of extended media packets are chosen, real-time location information can be shared without relying on either signaling messages or real-time transport control protocol (RTCP) packets.

Referring now to FIG. 1, an example mobile device location sharing and tracking system is shown in indicated by the general reference character 100. In this example, mobile device 102 may move from location A to location B. For example, mobile device 102 can be any suitable mobile computing device, such as a mobile phone, gateway, laptop, or mobile router. Mobile device 102 can receive media streams and analog voice signals, and may generate output media streams using an internal processor, such as a DSP. For example, mobile device 102 can provide stream 106-A from location A, and stream 106-B from location B, as well as other streams from intermediate locations between locations A and B. Of course, while two separate media streams (e.g., 106-A and 106-B) are discussed with respect to particular examples herein, these may in fact be the same continuous stream (e.g., while mobile device 102 is roaming).

Media streams 106-A and 106-B may include RTP packets, and can be provided to a centralized location, such as centralized server 104. For example, centralized server 104 may be a media server or media gateway. Alternatively or in addition to packets from mobile device 102 going directly to centralized server 104, media streams can be provided to another user, such as one utilizing a remotely located computing device that receives output packets from mobile device 102 (see, e.g., FIG. 8 below). In the particular example of FIG. 1, centralized server 104 can decode received packets, and perform some action using the real-time location information contained therein. For example, the location information can be provided to an analog signal output (e.g., for a user's ear), or the information may be saved to a memory portion (e.g., a disk).

Figure 2:
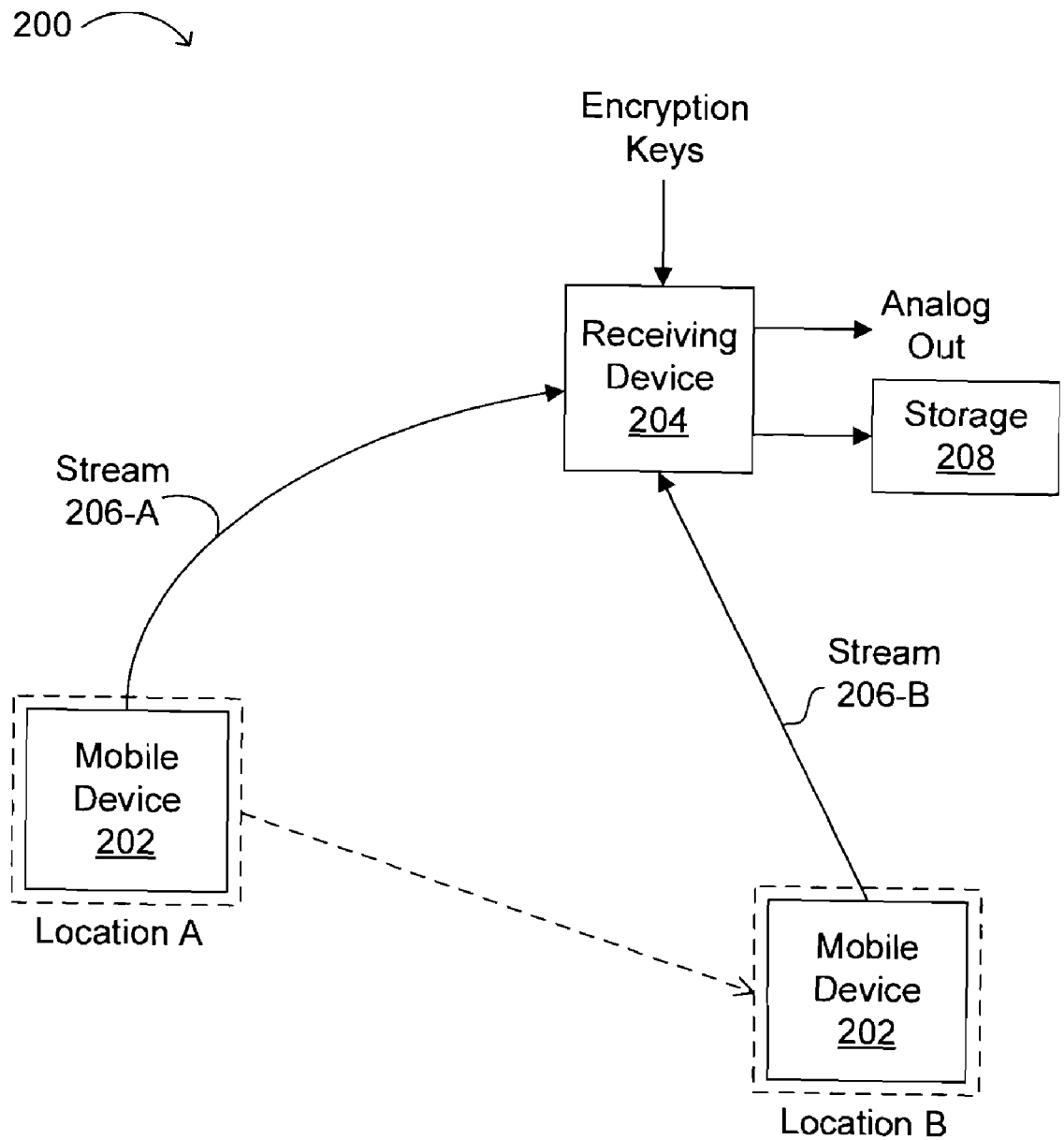
FIG. 2 illustrates an example encrypted stream mobile device location sharing and tracking system.

Referring now to FIG. 2, an example encrypted stream mobile device location sharing and tracking system is shown and indicated by the general reference character 200. Similar to the example of FIG. 1, mobile device 202 in FIG. 2 can provide stream 206-A from location A and stream 206-B from location B to receiving device 204. Also as in FIG. 1, media streams 206-A and 206-B may in fact be the same continuous stream (e.g., while mobile device 202 is roaming). In FIG. 2, receiving device 204 may be a centralized server, or any other computing device, including another mobile device. Further, in particular embodiments, media streams can be formatted using sRTP, as described in Internet Engineering Task Force (IETF) Request for Comments (RFC) 3711.

Encryption keys for sRTP can be provided to receiving device 204 in order to un-encrypt packets previously encrypted. The appropriate encryption keys may be pre-shared keys, or keys determined during the setup negotiation for the media sessions. For example, mobile device 202 can encrypt packets, such as those including real-time location information for mobile device 202, prior to sending streams of the encrypted packets to receiving device 204. If receiving device 204 has the appropriate encryption keys, the real-time location information of mobile device 202 can be derived, and then provided to storage 208, and/or output in any other suitable manner, such as via an analog output. In this fashion, any intermediate devices (e.g., receiving device 204) that can see media streams emanating from mobile device 202 can only obtain the real-time location information of mobile device 202 by using the appropriate encryption keys.

Accordingly, only users with the appropriate key can determine a location of the subject mobile device. This way, the locations of mobile device 202 can be maintained as private while passing through intermediate or unauthorized devices. However, authorized users (e.g., the family of the user of mobile device 202) can obtain this real-time location information by utilizing the encryption keys. Further, receiving device 204 may act as a forwarding device or a device/location pointer for access by others. For example, receiving device 204 may be coupled to an Internet site that can be accessed (e.g., by using a password) by family members to obtain real-time location information for mobile device 202.

Figure 3:
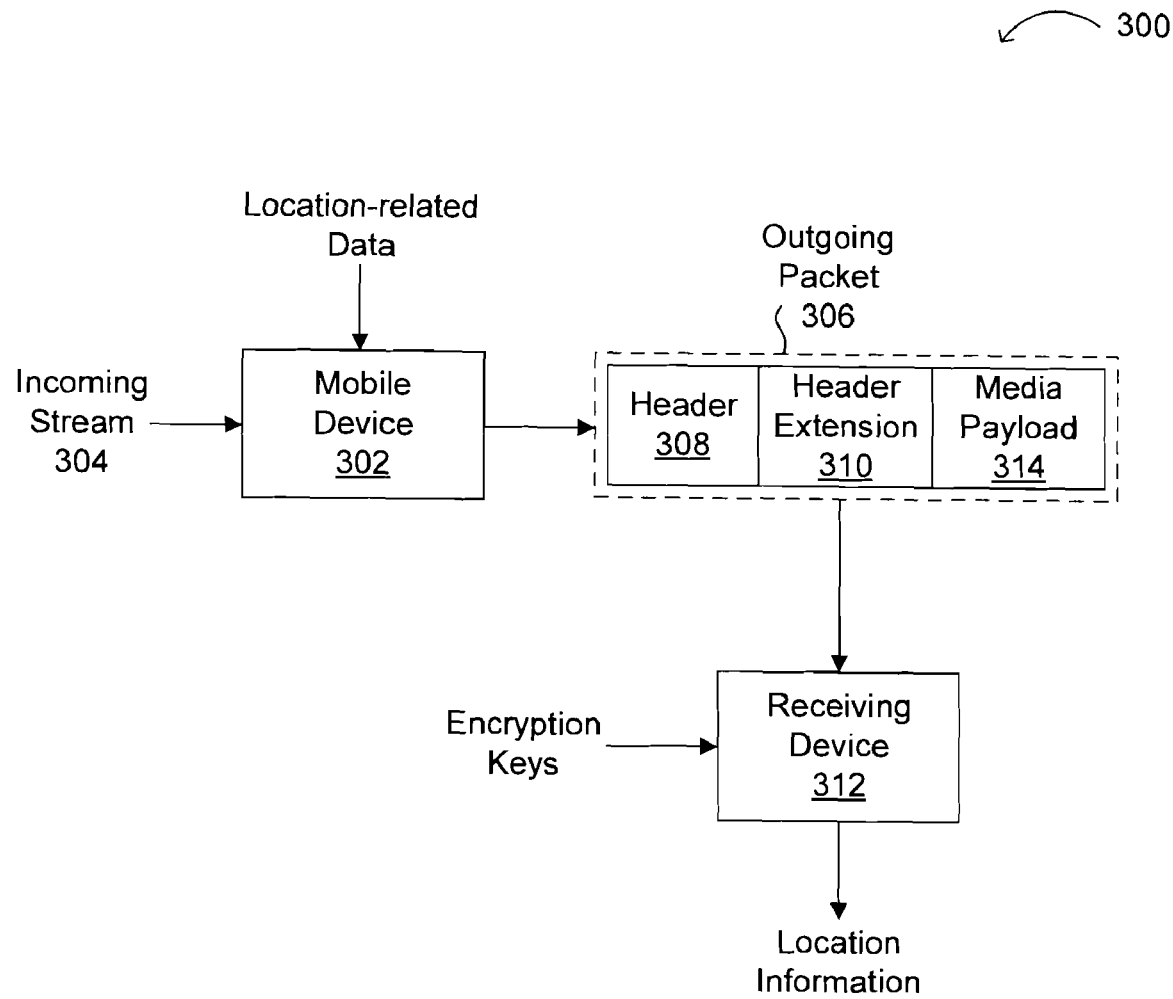
FIG. 3 illustrates an example media stream packet format between a mobile device and a receiving device.

Referring now to FIG. 3, an example media stream packet format between a mobile device and a receiving device is shown and indicated by the general reference character 300. Mobile device 302 can receive location-related data, as well as incoming stream 304. For example, a GPS, or geographic location/privacy (GEOPRIV) object format, as described in IETF RFC 3693, can be utilized for the location-related data.

Outgoing packet 306 can include header 308, header extension 310, and media payload 314. In particular embodiments, header extension 310 (an example of which will be discussed below with reference to FIG. 6) can include the real-time location of mobile device 302, which can be included in the outgoing stream itself. Thus, mobile device 302 can move around, and the location of the device may be inserted in its outgoing stream in real-time. As discussed above, GPS can be used to determine the location of mobile device 302, and this may be transferred dynamically to a DSP or other processor in mobile device 302. This information can then be embedded into a packet via a header extension (e.g., 310) by the DSP, for transferring to another site (e.g., via outgoing packet 306). In this fashion, real-time location information can be embedded continuously in a stream. Further, this real-time location information can be encrypted (e.g., the header extension and the media payload may be encrypted using sRTP), and then sent to receiving device 312. Encryption keys provided to receiving device 312 can allow for derivation of such encrypted location information.

Figure 4:
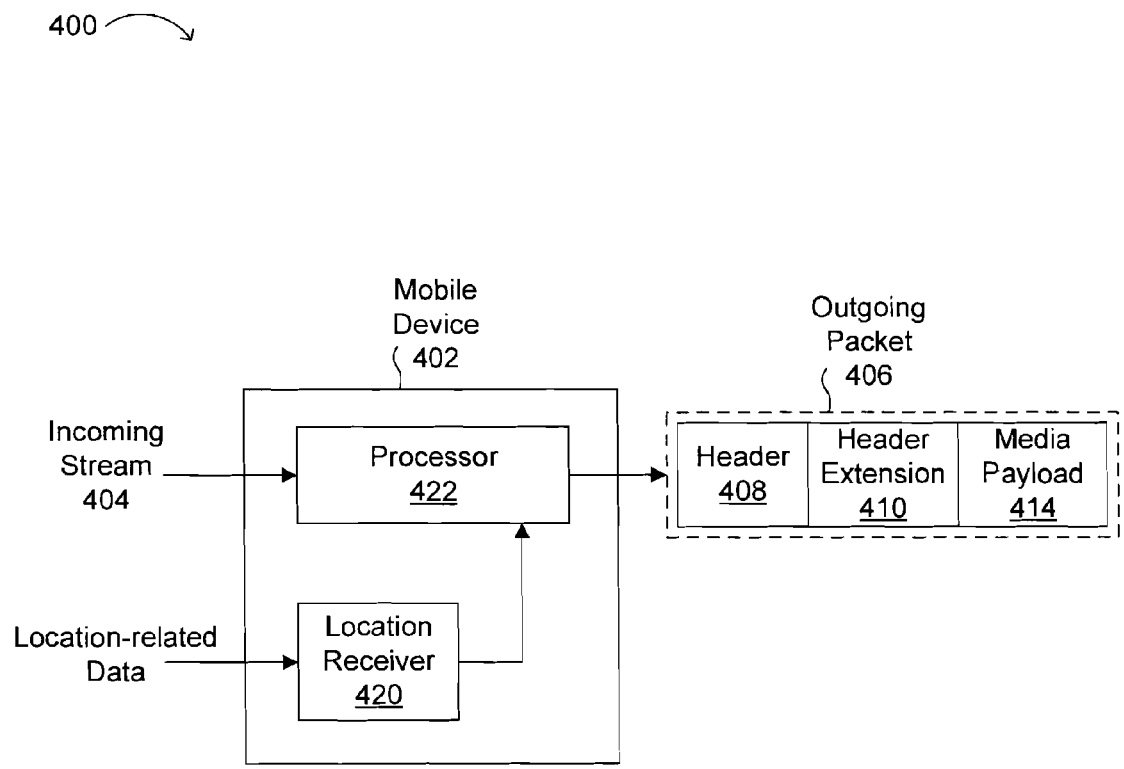
FIG. 4 illustrates example components of a mobile device for generating an outgoing packet.

Referring now to FIG. 4, example components of a mobile device for generating an outgoing packet are shown and indicated by the general reference character 400. Mobile device 402 (e.g., a cellular phone) can include processor 422 and location receiver 420. As discussed above, processor 422 can be a DSP, while location receiver 420 can be a GPS receiver, for example. In operation, processor 422 can receive incoming stream 404 (e.g., voice received by a cellular phone), such as when another mobile user is providing stream 404 to mobile device 402. Location receiver 420 can receive location-related data, which can include signals from satellites, such as GPS satellites.

Processor 422 can receive real-time location information from location receiver 420. In RTP, a bit (e.g., an "X" bit) can indicate that a header extension is to follow. Processor 422 can assert such an extension bit, thus allowing for header extension 410 (an example of which will be discussed below with reference to FIG. 6) to follow header 408 in the outgoing packet 406, which can also include media payload 414. Further, header extension 410 can include the real-time location information for mobile device 402. In this fashion, real-time location information can be embedded into an outgoing media stream.

Such location information can also be utilized in handoff or other applications. For example, it may be relatively difficult to determine which cell tower should perform a particular handoff. Also, signal strength may not always be the best indicator of an appropriate tower to which handoff should occur. However, based on real-time movement indicators in particular embodiments, handoff can be accommodated, and may be facilitated by receiving devices as discussed above.

Particular embodiments may be lightweight and scalable, with no additional messages or packets needed, and DSP or encoding software can efficiently handle extended RTP packets with minimal overhead. In addition, when other security mechanisms (e.g., sRTP) are used to guarantee the confidentiality of the media streams, the inserted location information can be encrypted to protect privacy. Accordingly, particular embodiments can provide scalable secure real-time end-to-end location information.

Figure 5:
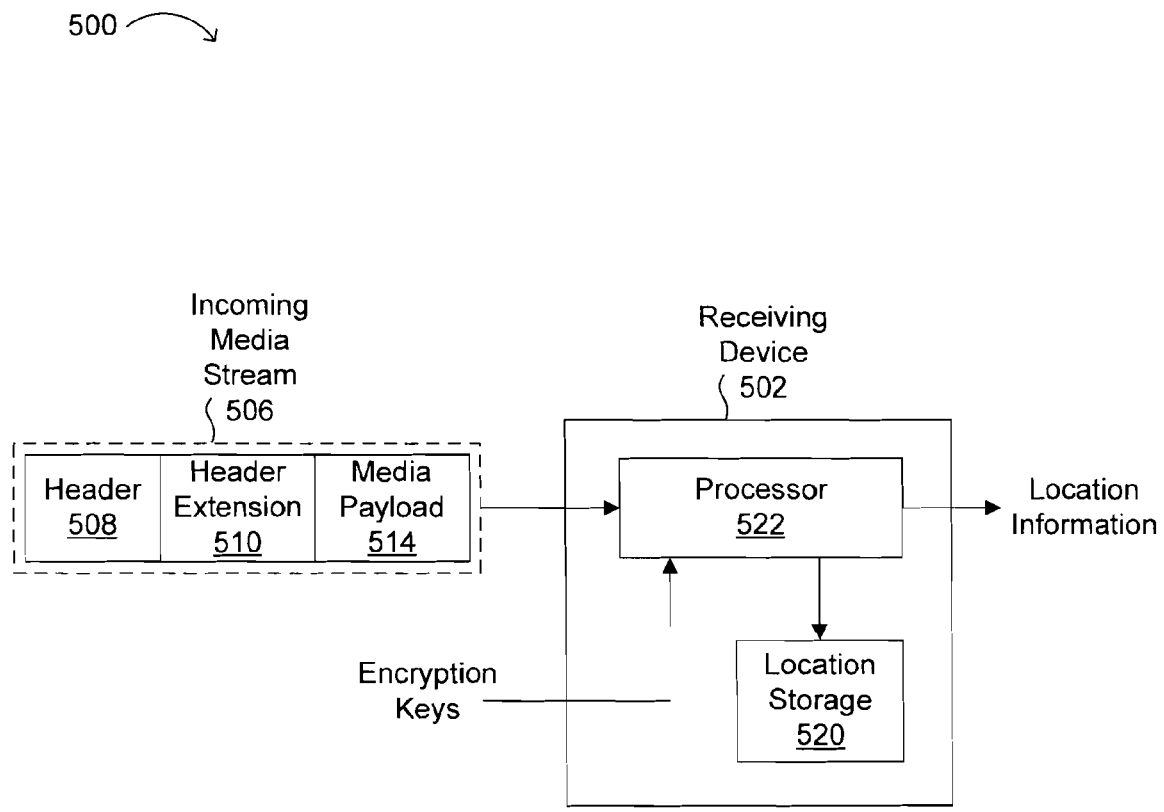
FIG. 5 illustrates example components of a receiving device for deriving location information of a mobile device.

Referring now to FIG. 5, example components of a receiving device for deriving location information of a mobile device are shown and indicated by the general reference character 500. Incoming media stream 506 can include packets having, for example, header 508, header extension 510 (an example of which will be discussed below with reference to FIG. 6), and media payload 514. Receiving device 502 can include processor 522 that can receive incoming media stream 506, as well as encryption keys. Processor 522 can output location information (e.g., for a remote mobile device), and/or may provide this information to storage location 520.

Figure 6:
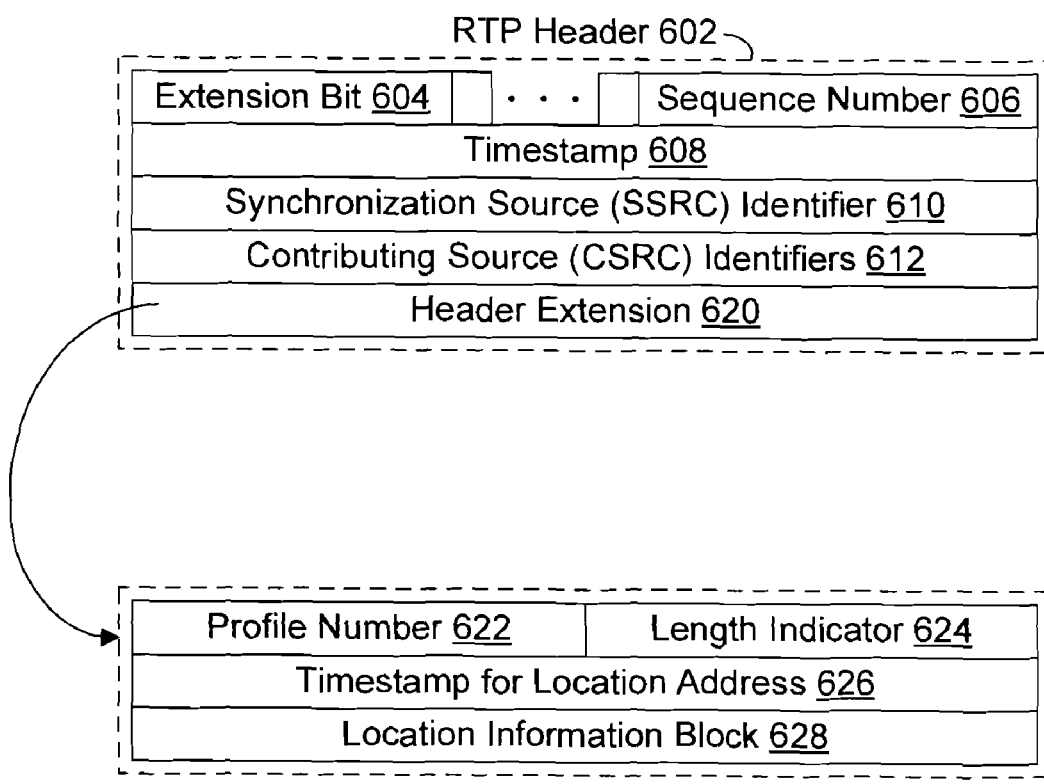
FIG. 6 illustrates an example packet header extension format for real-time location information.

Referring now to FIG. 6, an example packet header extension format for real-time location information is shown and indicated by the general reference character 600. In particular embodiments, an extension for a packet header can utilize portions of an RTP format, as described in IETF RFC 1889. For example, RTP header 602 can include extension bit (e.g., "X" bit) 604 for indicating that header extension 620 is to be appended to RTP header 602. RTP header 602 can also include sequence number 606, timestamp 608, synchronization source (SSRC) identifier 610, and contributing source (CSRC) identifiers 612. Header extension 620 may follow CSRC identifiers 612 in the packet header format. In extension 620, a profile number or bit string 622 (e.g., for specifying a particular profile under which extension implementations are operating) can be included, as well as a length (e.g., number of bytes) of the extension indicator 624.

Extension 620 may also include a type value defined as a sample (e.g., which can be updated at a later time), timestamp for location address 626, and location information block 628. A timestamp for the embedded real-time location information in particular embodiments can be included in header extension 620 as timestamp for location address 626. In addition, a different, regular RTP packet timestamp can be included in RTP header 602 as timestamp 608. Also, the location information may be embedded as one block or multiple blocks. In this example, one block 628 may be utilized for conveying the real-time location information. Further, such location information can be included in a header extension in any suitable format, such as GPS address or GEOPRIV object format, as discussed above.

In particular embodiments, a mobile device sharing its real-time location information can include: (i) real-time location information of the mobile user being collected (e.g., using GPS); (ii) a DSP that can receive and determine if the real-time location information is to be inserted into outgoing RTP packets (e.g., when there is no location change, or any number of consecutive packets announcing the same location, there may be no need for insertion); (iii) if the insertion is needed, the location information can be embedded into header extensions of RTP packets; (iv) if sRTP is used, the extended block can be encrypted to protect privacy; and (v) the RTP packets with header extensions can be transmitted in the outgoing media stream.

Figure 7:
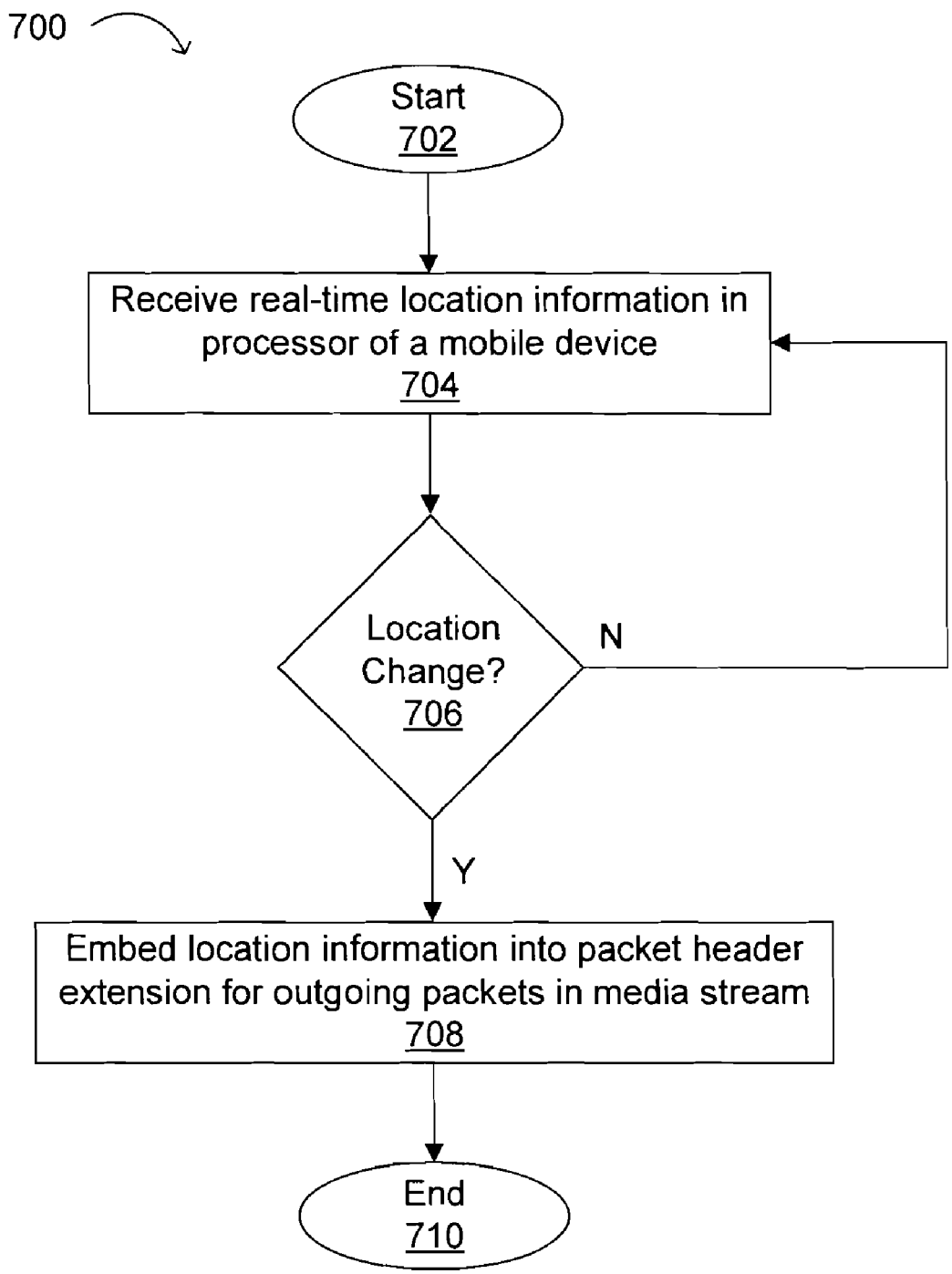
FIG. 7 illustrates a flow diagram for an example method of sharing and tracking location information.

Referring now to FIG. 7, a flow diagram for an example method of sharing and tracking location information is shown and indicated by the general reference character 700. The flow can begin (702), and real-time location information can be received in a processor of a mobile device (704). If there is no change in location of the mobile device (706), the flow can return for continued receipt of real-time location information (704). However, when there is such a location change (706), such location information can be embedded into a packet header extension for outgoing packets in a media stream (708), and the flow can complete (710).

Figure 8:
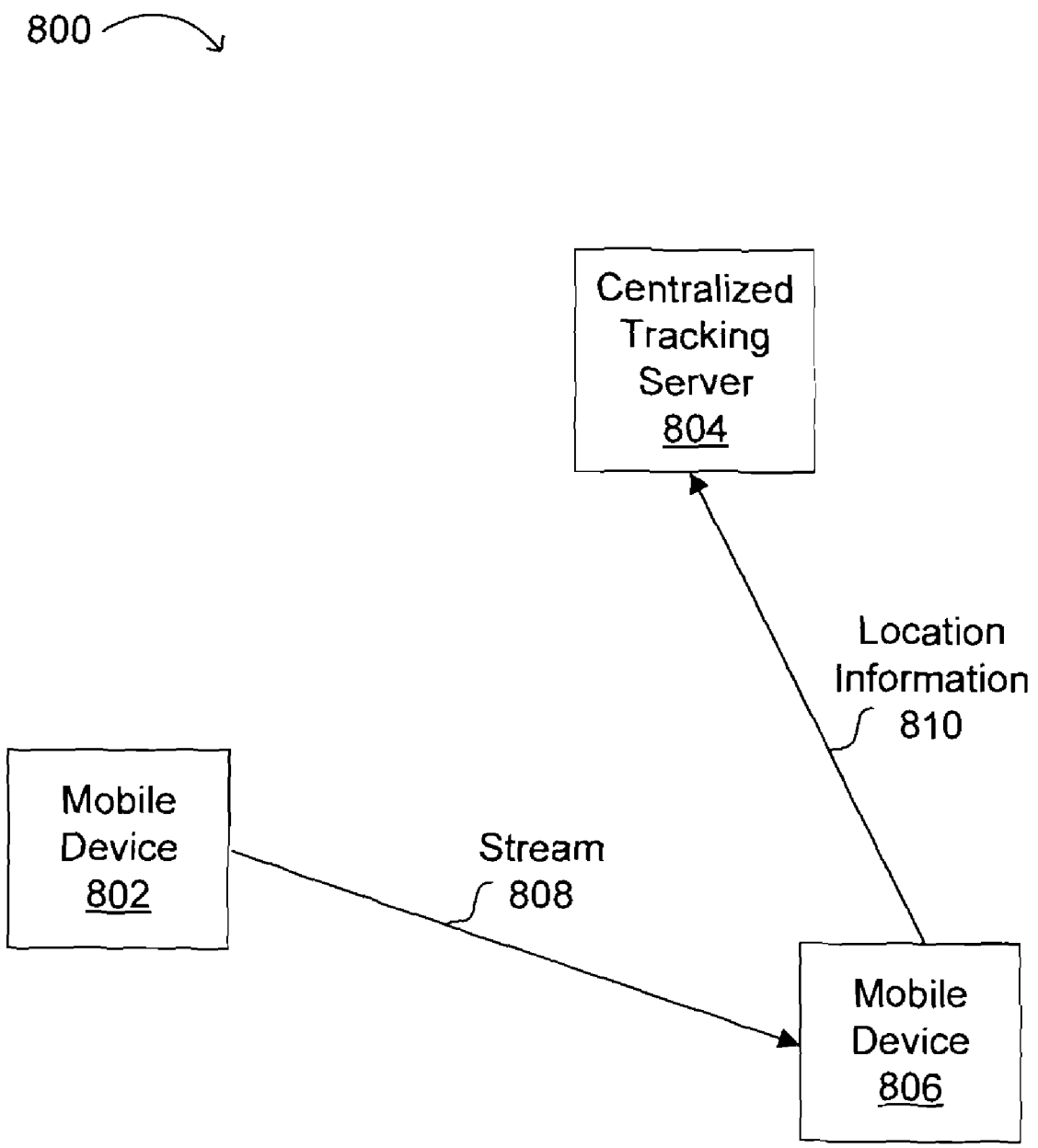
FIG. 8 illustrates an example peer-to-peer mobile device sharing and tracking system.

Referring now to FIG. 8, an example peer-to-peer mobile device sharing and tracking system is shown and indicated by the general reference character 800. Here, mobile device 802 may be in communication with peer device 806, and may send stream 808 containing location information embedded (e.g., in a packet header extension) therein. Mobile device 806 may derive this location information 810 and send along to centralized tracking server 804. Alternatively, mobile device 806 can simply store or otherwise utilize location information 810 without sending to centralized tracking server 804. For example, control of such location information forwarding and/or local use can be defined in the packet header extension and/or stream (e.g., 806). In this fashion, media traffic from mobile device 802 may not need to pass through centralized tracking server 804 in order to convey its location information.

Figure 9:
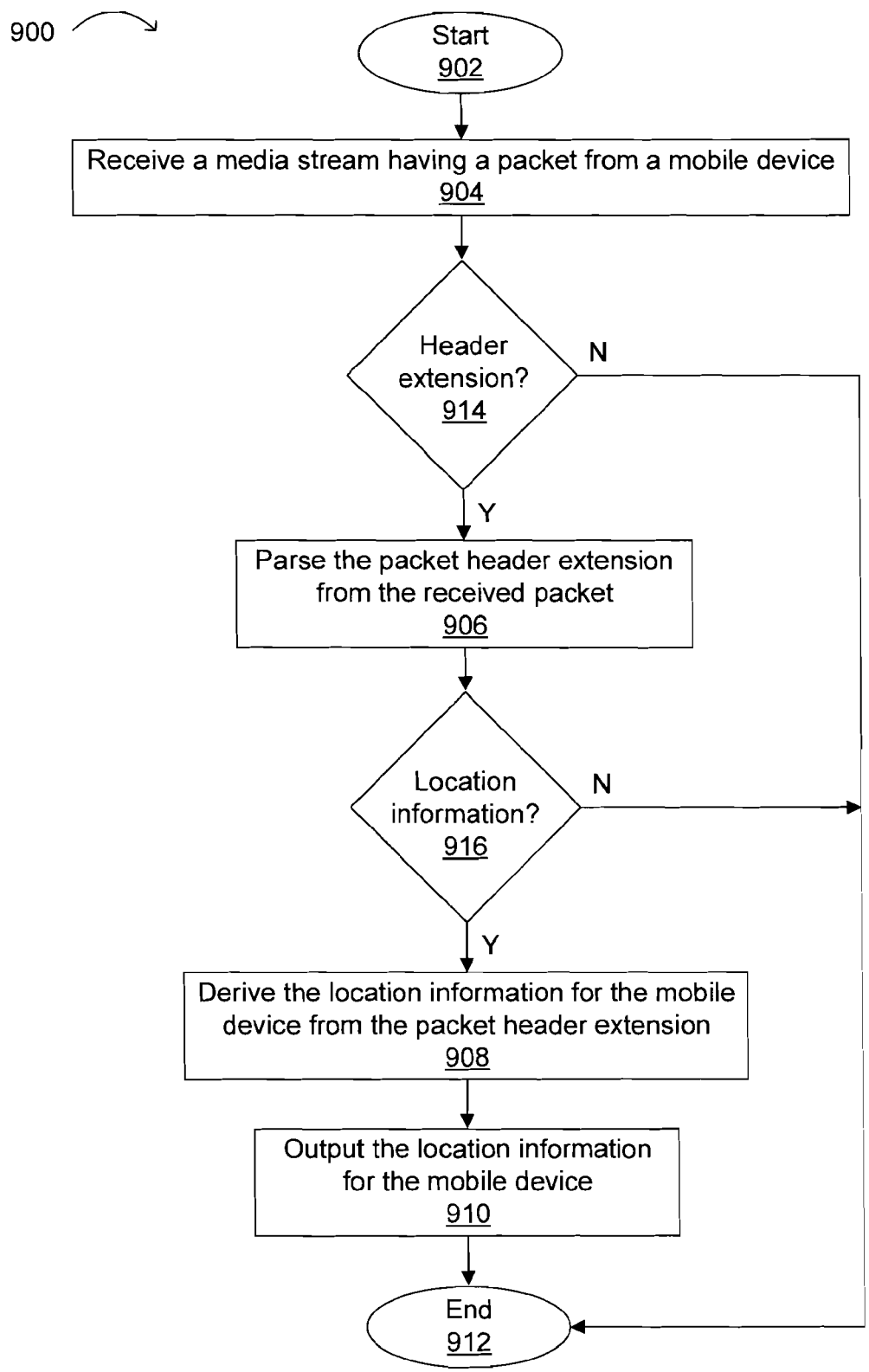
FIG. 9 illustrates a flow diagram for an example method of receiving mobile device location information.

Referring now to FIG. 9, a flow diagram for an example method of receiving mobile device location information is shown and indicated by the general reference character 900. The flow can begin (902), and a media stream having a packet can be received from a mobile device (904). If a packet header extension is found in the received packet, such as via an "X" bit or other suitable indication (914), the packet header extension can be parsed from each received packet (906). If the extension contains location information (916), such location information for the mobile device can be derived from the packet header extension (908). This location information for the mobile device can be output (910), and the flow can complete (912).

In particular embodiments, a scalable light-weight method for sharing and tracking real-time location for mobile users on multimedia sessions can be accommodated. Further, using current security mechanisms on media streams (e.g., sRTP), secure real-time location information from end-to-end without involvement of signaling paths can be provided. Also, because this approach may not require additional signaling messages or RTCP packets, scalability can be supported. Further, privacy of location information can be protected from end-to-end with combinations of sRTP, or other security mechanisms, on media paths. In addition, particular embodiments can be applied in multicast multimedia sessions for sharing location information. Also, risks from losing privacy of location information can be minimized because nodes may not be involved in signaling paths.

Although the description has been described with respect to particular embodiments thereof, these particular embodiments are merely illustrative, and not restrictive. For example, while particular packet header and media stream formats have been described, any suitable packet header and/or media stream format for supporting real-time location information can be utilized in particular embodiments. Also, while specific device types and system arrangements have been described herein, any suitable devices and/or arrangements can be utilized for sharing location information in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus, comprising:
    a receiver in a mobile device, the receiver being configured to receive location-related data about the mobile device, and to provide real-time location information therefrom, wherein the mobile device is configured to receive an incoming media stream and provide an outgoing media stream; and
    a processor configured to receive the real-time location information, and to provide an extension in a packet header of the outgoing media stream, the header extension being indicated as appended to the packet header by an extension bit in the packet header, wherein the header extension comprises:
        the real-time location information of the mobile device;
        a profile indicator for indicating an operating profile for the header extension;
        a length indicator for indicating a number of bytes for the header extension; and
        a timestamp for the real-time location information.

2. The apparatus of claim 1, wherein the receiver comprises a global positioning system (GPS) receiver.

3. The apparatus of claim 1, wherein the processor comprises a digital signal processor (DSP).

4. The apparatus of claim 1, further comprising logic encoded in one or more tangible media for execution by the processor and when executed operable to encrypt the header extension.

5. The apparatus of claim 1, wherein the packet header is configured to use real-time protocol (RTP).

6. The apparatus of claim 1, wherein the packet header is configured to use secure real-time protocol (sRTP).

7. The apparatus of claim 1, wherein the outgoing media stream comprises an outgoing packet with the header extension, the outgoing packet further comprising a media payload.

8. The apparatus of claim 1, wherein the real-time location information is stored in the mobile device.

9. The apparatus of claim 1, wherein the outgoing media stream is sent to a plurality of network devices, wherein only one of the plurality of network devices is configured to decrypt the real-time location information.

10. A method, comprising:
receiving real-time location information about a mobile device in a processor of the mobile device, wherein the mobile device is configured to receive an incoming media stream and provide an outgoing media stream; and
embedding the real-time location information into an extension of a packet header in the outgoing media stream from the mobile device in response to a changing location of the mobile device, the header extension being indicated as appended to the packet header by an extension bit in the packet header, wherein the header extension further comprises:
a profile indicator for indicating an operating profile for the header extension;
a length indicator for indicating a number of bytes for the header extension; and
a timestamp for the real-time location information.

11. The method of claim 10, wherein the receiving the real-time location information comprises using a global positioning system (GPS) receiver.

12. The method of claim 10, further comprising encrypting the header extension.

13. The method of claim 12, wherein the encrypting uses secure real-time protocol (sRTP).

14. The method of claim 10, wherein the outgoing media stream comprises an outgoing packet with the header extension, the outgoing packet further comprising a media payload.

15. The method of claim 10, wherein the embedding the real-time location information comprises using real-time protocol (RTP).

16. The method of claim 10, further comprising sending the outgoing media stream to a plurality of network devices, wherein only one of the plurality of network devices is configured to decrypt the real-time location information.

17. The method of claim 10, further comprising transmitting the header extension after the packet header and before a payload associated with the packet header in the outgoing media stream.

18. The method of claim 10, further comprising indicating a destination for the real-time location information in the header extension.

19. The method of claim 10, further comprising storing the real-time location information in the mobile device.

20. A system for sharing a location of a mobile device, the system comprising:
means for receiving real-time location information about a mobile device in a processor of the mobile device, wherein the mobile device is configured to receive an incoming media stream and provide an outgoing media stream; and
means for embedding the real-time location information into an extension of a packet header in the outgoing media stream from the mobile device in response to a changing location of the mobile device, the header extension being indicated as appended to the packet header by an extension bit in the packet header, wherein the header extension further comprises:
a profile indicator for indicating an operating profile for the header extension;
a length indicator for indicating a number of bytes for the header extension; and
a timestamp for the real-time location information.

* * * * *